(12) United States Patent
Edwards

(10) Patent No.: US 10,371,274 B2
(45) Date of Patent: Aug. 6, 2019

(54) HYDRAULIC SWITCH

(71) Applicant: Vincent Edwards, Caerphilly (GB)

(72) Inventor: Vincent Edwards, Caerphilly (GB)

(*) Notice: Subject to any disclaimer, the term of this patent is extended or adjusted under 35 U.S.C. 154(b) by 412 days.

(21) Appl. No.: 15/100,755

(22) PCT Filed: Dec. 1, 2014

(86) PCT No.: PCT/GB2014/053555
§ 371 (c)(1),
(2) Date: Jun. 1, 2016

(87) PCT Pub. No.: WO2015/082888
PCT Pub. Date: Jun. 11, 2015

(65) Prior Publication Data
US 2016/0305564 A1    Oct. 20, 2016

(30) Foreign Application Priority Data
Dec. 2, 2013    (GB) .................................. 1321216.2

(51) Int. Cl.
*F15B 20/00* (2006.01)
*F16K 17/36* (2006.01)
*F16K 11/085* (2006.01)

(52) U.S. Cl.
CPC ............ *F16K 17/363* (2013.01); *F15B 20/00* (2013.01); *F16K 11/0856* (2013.01)

(58) Field of Classification Search
CPC ..... F15B 20/00; F16K 11/0856; F16K 17/363

USPC ......................................... 137/625.22, 625.6
See application file for complete search history.

(56) References Cited

U.S. PATENT DOCUMENTS

| 7,255,037 | B2* | 8/2007 | Edwards | ................... | E02F 9/24 |
| | | | | | 200/61.52 |
| 7,832,427 | B2* | 11/2010 | Coley | ................. | F15B 13/0406 |
| | | | | | 137/625.6 |

FOREIGN PATENT DOCUMENTS

| GB | 2420109 A | 5/2006 |
| GB | 2448705 A | 10/2008 |
| JP | S6351972 A | 3/1988 |
| WO | WO-9111166 A1 | 8/1991 |
| WO | WO-2013088319 A1 | 6/2013 |

* cited by examiner

*Primary Examiner* — Kevin F Murphy
(74) *Attorney, Agent, or Firm* — Dinsmore & Shohl LLP

(57) ABSTRACT

The present invention relates to a hydraulic switch arrangement and a fluid switch for incorporating into a hydraulic switch arrangement that may be included in a hydraulic circuit for inhibiting flow of hydraulic fluid through a hydraulic circuit in the event of movement of an apparatus or platform from a stable to an unstable condition. Such platforms or apparatus may include for example, cranes, excavators, teletrucks and forklift trucks and roll over incidents of such machinery is common leading to numerous fatalities. Aspects of the present invention ensure fast switching in the event of a transfer from a stable to an unstable condition.

13 Claims, 5 Drawing Sheets

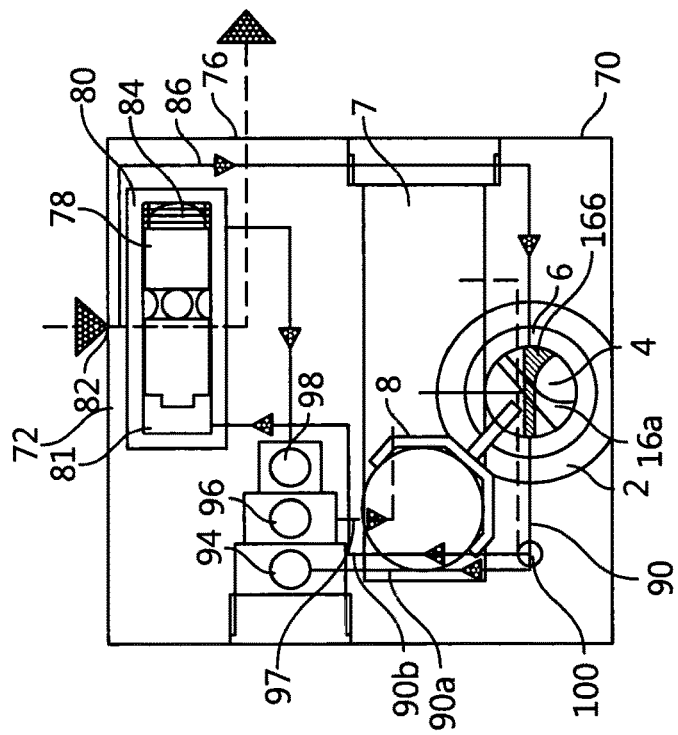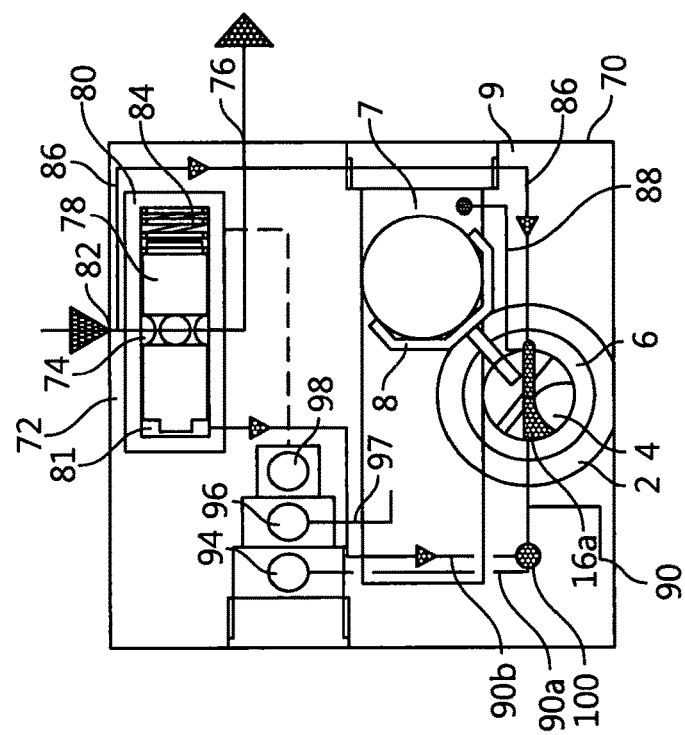

HYDRAULIC SWITCH

The present invention relates to a hydraulic switch arrangement and a fluid switch for incorporating into such a hydraulic switch arrangement that may be included in a hydraulic circuit. Particularly but not exclusively the inventive aspects may be utilised for inhibiting flow of hydraulic fluid through a hydraulic circuit in the event of movement of an apparatus or platform from a stable to an unstable condition.

There are numerous examples of platforms or apparatus which are configured to lift. These may include cranes, excavators, tele-trucks and fork lift trucks. Roll-over incidents of such machinery is common leading to numerous fatalities. With reference for example to a fork lift truck, there are numerous incidences where a lift may be dangerous and the operator may not be aware of actual danger or believe they will be able to complete the lift safely, either through inexperience or recklessness. However, if a fork lift truck is attempting to lift on an incline and is pointing down the incline, there is a possibility that the load will tilt forwards leading to danger to any bystanders. Alternatively, on a generally flat surface, if a load is too great, there is a possibility of the fork lift truck tipping due to over balancing due to the weight of the load. Furthermore, if the fork lift truck extends and lifts, there is possibility that as the load is extended away from the truck, the truck may tip due to the weight and thus moment as a result of the load. Reliance is therefore placed on the operator's experience. In the event that the operator is not significantly experienced, or the operator is not aware of the load to be lifted, there is a distinct possibility of the machinery tipping over leading to damage to the load and machinery and potentially damaging consequences to the operator or bystanders.

In another application fluid switches are provided for use in a locking mechanism of a hydraulic circuit for ensuring the safe release of mechanical components. Hydraulic circuits incorporating a 'quick-hitch' system facilitate a quick release and/or attachment of various mechanical components, such as the attachment of an excavator (to an excavator arm) or crane lifting equipment. In this manner, different components can be readily assembled to suit a particular job function. However, such hydraulic circuits have been found to release the mechanical components unexpectedly, which can have fatal consequences. There is therefore a requirement for a safety release mechanism to limit the assembly and/or disassembly of mechanical components to specific circumstances of operation. In one example an excavator boom may be attached to a bucket to form the working part of an excavator machine. Movement of the boom and bucket is facilitated using hydraulic rams which form part of the hydraulic circuit. In order to remove the bucket from the arm it is necessary to operate a hydraulic quick-hitch which secures the bucket to the arm. By positioning the switch at the correct location on a mechanical component such as the boom, within the hydraulic circuit, the switch only allows operation of the quick-hitch and thus release of the bucket when the body is suitably orientated. This prevents the bucket from unexpectedly falling from its holding point. By suitably positioning the switch on the boom or similar mechanical component release of the bucket can be limited to when it is positioned on the ground.

The present invention provides a hydraulic switch arrangement and fluid switch therefor which actuates reliably in the event of an unstable load apparatus or platform with significantly improved reliability and accuracy. Further, the present invention provides a reliable hydraulic switch arrangement and fluid switch for a hydraulic switch arrangement that ensures safe release of mechanical components.

According to one aspect of the present invention there is a hydraulic switch arrangement for incorporating into a hydraulic circuit comprising:
- a first fluid switch operational in an open and closed configuration for enabling and disabling flow of hydraulic fluid through a hydraulic circuit;
- a second fluid switch having at least one through-passage configured to receive hydraulic fluid from the hydraulic circuit, the second fluid switch operational in a first operational configuration arranged to inhibit passage of hydraulic fluid through the through-passage, and a second operational configuration configured to permit passage of hydraulic fluid through the through-passage;
- wherein the arrangement is configured such that change between the first and second operational configuration of the second fluid switch causes change in the operational state of the first fluid switch between the open and closed configuration.

The present invention enables opening and closing or activating and deactivating of a hydraulic circuit through the provision of a first fluid switch. It is beneficial, however, that the first fluid switch is operated by a second fluid switch. This means that the activation of the first fluid switch that enables and disables flow of hydraulic fluid through the hydraulic circuit is operated by the second fluid switch which may have increased sensitivity. The second fluid switch can be operated by tilting of the hydraulic switch arrangement for example. The second fluid switch can also be operated through inertia or shaking for example. The first fluid switch is preferably arranged to be positioned into the primary fluid flow path through a hydraulic circuit. This ensures that as the first fluid switch is changed from an open to a closed configuration hydraulic fluid flow through the hydraulic circuit is prevented thus ensuring that operation of the apparatus is also prevented. This provides significant safety advantages.

The first fluid switch and the second fluid switch are beneficially arranged to be positioned in parallel in the fluid flow path in a hydraulic circuit. The second fluid switch is beneficially in fluid communication with a pilot hydraulic fluid line arranged to be in fluid communication with a hydraulic circuit. This means that the second fluid switch is pilot operated. This provides the advantage that the second fluid switch is operated without the requirement of the high pressure that is present in the main hydraulic circuit. As such it is beneficial that a bore defining the hydraulic fluid flow path through the first fluid switch is greater than the bore of the through-passage.

The hydraulic switch arrangement beneficially further comprises a body formed with a chamber and a member disposed in the chamber for movement along a pre-determined path, the second fluid switch comprising a rotatable element having a pair of arms disposed on either side of the member such that the member impinges on one arm or the other in the event of movement in one direction or the other along the pre-determined path to correspondingly turn the rotatable element and change the operational configuration of the second fluid switch. Accordingly, on tilting, shaking or inertia of the hydraulic switch arrangement, the member such as a ball transfers along the predetermined path and correspondingly turns the rotatable element to change the operational configuration of the second fluid switch. This in turn causes an operational change in the first fluid switch.

The first fluid switch is beneficially in fluid communication with the through-passage, and the fluid switch is arranged to switch between the open and closed configuration by fluid flow from the through-passage. The through-passage preferably comprises an inlet for receipt of hydraulic fluid from the main hydraulic circuit. The through-passage preferably comprises an outlet which is in fluid communication with the first fluid switch. As such fluid flow from the outlet of the through-passage causes activation or a change in the operational configuration of the fluid switch.

The first fluid switch beneficially comprises an activating element for changing a fluid switching element between the open and closed configuration. The activating element may, for example, be a check-valve known in the art, and the fluid switching element may be a spool valve which is also known in the art. A first hydraulic flow path is beneficially defined between the through-passage and the activating element and a second fluid flow path is beneficially defined between the through passage and the switching element. As such the fluid flow path from an outlet of the through-passage effectively bifurcates to the activating element and switching element.

The fluid switching element beneficially comprises a body portion moveable in a fluid switching element chamber defined by a housing, the body portion moveable between the open and closed configuration, wherein passage of hydraulic fluid through the first hydraulic flow path to the activating element causes release of hydraulic fluid from the chamber and flow of hydraulic fluid through the second flow path enables transfer of hydraulic fluid to the fluid switching element chamber such that the body portion in the fluid switching element chamber moves from the open to the closed configuration. The first fluid switch is therefore effectively operated by hydraulic fluid flow through the first and second hydraulic fluid flow paths from the through-passage.

The body portion is beneficially biased to the open configuration by a biasing element. The biasing element is beneficially a spring. The biasing element is seated in the fluid switching element chamber. The body portion beneficially has a rearward end and a forward end, the rearward end and housing defining a first chamber portion and the forward end and housing defining a second chamber portion, the first chamber portion being in fluid communication with the second fluid flow path, and transfer of hydraulic fluid to the activating element through the first hydraulic flow path enables release of hydraulic fluid from a second chamber portion.

There is beneficially a fluid flow path defined between the first fluid switch and the chamber. This is beneficial as the member in the chamber is lubricated through hydraulic fluid transferring from the first fluid switch to the chamber. This means that in one embodiment as the hydraulic switch arrangement transfers from the closed to the open configuration, lubrication of the member in the chamber is achieved. It is beneficial that the second chamber portion is in fluid communication with the chamber.

The second fluid switch preferably comprises a second through-passage, where in the first operational configuration the second fluid switch is arranged to permit passage of hydraulic fluid through the second through-passage, and in a second operational configuration the second fluid switch is configured to inhibit passage of hydraulic fluid through the second through-passage.

The hydraulic switch arrangement beneficially comprises a housing for accommodating the first and second fluid switches, the housing comprising a first inlet for fluid communication with the first fluid switch, and a second inlet arranged to communicate with a second fluid switch. This means that the housing can effectively be introduced into an existing hydraulic fluid flow path in an existing hydraulic circuit. The main fluid flow path is beneficially connected to the first inlet. The second inlet beneficially communicates with a pilot line transferring hydraulic fluid from the main hydraulic circuit. As hereinbefore described the bore of the pilot line is significantly reduced in cross-sectional area compared to the bore of the main hydraulic fluid flow path and preferably the bore of the first inlet meaning that the pressure at the second fluid switch is reduced.

The through-passage beneficially has a mouth, and wherein the through-passage tapers inwardly from the mouth. This improves the speed at which the second fluid switch transfers between the first and second operational configuration.

The second fluid switch beneficially comprises a rotatable element rotatably mounted to a housing, and at least one bearing arranged to enable relative rotation between the rotatable element and the housing, the rotatable element defining the through-passage arranged to align with a duct in the housing in the second operational configuration, wherein a hydraulic fluid flow path is defined between the duct and the at least one bearing in the first operational configuration. This provides a beneficial second fluid switch that ensures improved sensitivity to rotation through the provision of at least one bearing which is lubricated by hydraulic fluid flow. This flow is via the pilot line.

The hydraulic switch arrangement beneficially comprises a tilt switch and/or an inertia switch. An inertia switch may, for example, be installed in a train to aid in sudden braking.

According to a second aspect of the present invention there is a fluid switch arrangement for incorporating into a hydraulic switch arrangement, the fluid switch arrangement comprising a rotatable element rotatably mounted relative to a housing the rotatable element rotatable between a first operational and second operable configuration, the rotatable element having at least one through-passage arranged to align in at least one rotational position with a duct formed in the housing to provide the second operable configuration, the through-passage having a mouth and wherein the through-passage tapers inwardly from the mouth.

This is beneficial as soon as the rotatable element begins to rotate through tilting, for example, hydraulic fluid hits the tapered through-passage and causes a fast change in operational configuration of the fluid switch arrangement. This ensure that in operation in a hydraulic switch arrangement, for example, according to a first aspect of the present invention, the hydraulic fluid flow through the main hydraulic circuit is switched off extremely quickly.

The through-passage beneficially has a longitudinal axis and the cross-sectional area of the through-passage perpendicular to the longitudinal axis decreases inwardly from the mouth.

At least a portion of the wall defining the through-passage extending inwardly from the mouth is generally convex. This is unexpected as during development and determination of the benefit of providing a tapered through-passage inwardly from the mouth it was expected that a concave tapering would be preferred. Unexpectedly, however, a convex tapering provided significantly improved performance in ensuring fast switching between the first and second operational configurations.

At least a portion of the wall defining the passage extending inwardly from the mouth is linear. The linear portion of the wall is beneficially substantially cylindrical. The wall defining the through-passage beneficially tapers inwardly from the mouth to an intermediate position wherein the cross-sectional area of the through-passage is substantially cylindrical, and preferably wherein the cylindrical cross-section extends from the intermediate location to a second through-passage mouth, and preferably wherein the substantially cylindrical cross-sectional area is less than the minimum cross-sectional area of the through-passage between the mouth and the intermediate position.

The through-passage is generally perpendicular to the axial length of the element. The element beneficially comprises a pair of arms configured such that a member impinges onto one arm or the other to cause rotation of the element thereby switching between the first and second operable configurations.

The rotatable element further comprises a second through-passage arranged to align in a first operational configuration with a second duct formed in the housing. A second through-passage beneficially has a mouth and wherein the through-passage tapers inwardly from the mouth. It will be appreciated that the second through-passage has the same beneficial features as the first through-passage.

It will be further appreciated that the fluid switch arrangement as described and features thereof are preferred features of the second fluid switch in the hydraulic switch arrangement as defined with respect to the first aspect.

In a third aspect of the present invention there is a fluid switch arrangement for incorporating into a hydraulic switch arrangement, the fluid switch comprising a rotatable element rotatably mounted relative to a housing, the rotatable element comprising a first through-passage arranged to misalign in a first operational configuration with a first duct formed in the housing to inhibit passage of hydraulic fluid and wherein the first through-passage becomes aligned with the first duct when the spindle arrangement is in the second operational configuration to enable passage of hydraulic fluid through the first through-passage, the fluid switch further comprising at least one bearing to enable relative rotation between the rotatable element and the housing, wherein a hydraulic fluid flow path is provided between the first duct and the at least one bearing in the first operational configuration.

Such a fluid switch arrangement is ensured to be sensitive to actuation due to the configuration of the hydraulic fluid flow path between the duct and the bearing in the first operational configuration.

The rotatable element is beneficially at least partially received by the housing, and the hydraulic fluid flow path is provided between an inner surface of the housing and an outer surface of the rotatable element. The rotatable element beneficially comprises a second through passage arranged to align with a second duct in the housing when the switch is in the first operational configuration. The first and second through-passages are beneficially axially spaced apart in the rotatable element.

The element and/or housing is/are beneficially configured to provide a seal intermediate the first and second through-passage in the axial length of the rotatable element. This is to ensure that there is no transfer of hydraulic fluid between the first and second through passages as this would affect the accuracy of the sensitivity of the fluid switch arrangement.

A second bearing is beneficially axially spaced from the first bearing. This ensures very smooth rotation of the rotatable element.

The seal is beneficially a fluid seal. The fluid seal may be beneficially termed a 'labyrinth' seal. This provides an improved seal over, for example, an 'O' ring. The housing and/or element beneficially include(s) an annular recess therein, wherein in operation the annular recess forms a fluid seal.

The annular recess is beneficially formed of a generally 'U' shape, the walls defining the sides of the 'U' shape being substantially parallel. The radially inwardly wall of the 'U' shape is beneficially substantially linear and preferably substantially parallel to the longitudinal axis of the rotational element. A thrust collar is beneficially configured to restrain axial movement of the rotational element. As a result of the hydraulic fluid flow path between the first duct and the at least one bearing in the first operational configuration an axial force is applied to the rotational element and this is retrained by a thrust collar. The thrust collar may be incorporated into the at least one bearing. A resiliently biasing element is arranged to oppose movement of the rotational element in the axial direction. The provision of the thrust collar and even more beneficially resiliently biasing element ensures that in operation there is free movement of the rotational element between the first and second operational configurations.

The rotational element beneficially comprises a pair of arms configured such that a member impinges onto one arm or the other to cause rotation of the rotational element thereby switching the fluid switch between the first and second operational configurations. It will be appreciated that the fluid switch arrangement as hereinbefore described in the third aspect and features thereof, are beneficially included in a hydraulic switch arrangement according to a first aspect of the present invention.

Aspects of the present invention ensure that a hydraulic switch arrangement is only activated once a threshold tilt angle is achieved, which may be accurately controlled.

Exemplary embodiments of aspects of the present invention will now be described by way of example only with reference to the accompanying drawings in which:

FIGS. 5a and 5b are schematic representations of a hydraulic switch according to an exemplary embodiment of the present invention.

Figure 1:
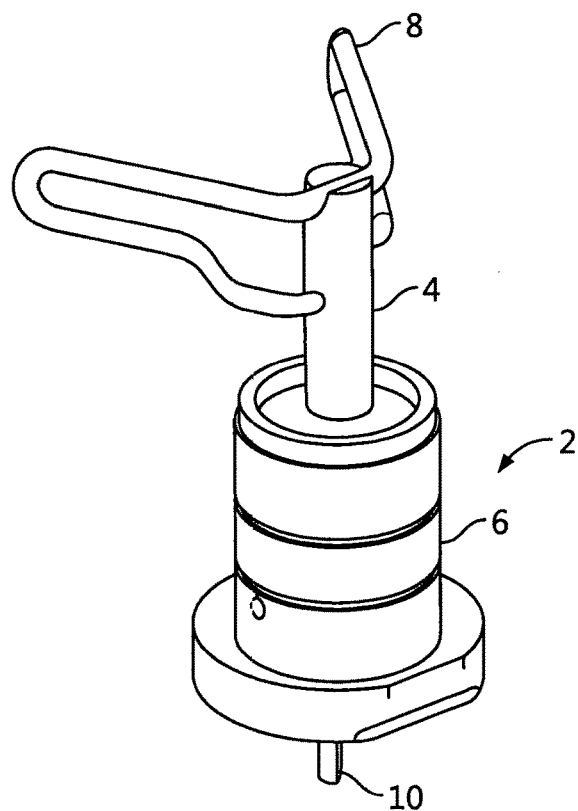
FIGS. 1, 2 and 3 are perspective, side and cross sectional views of the spindle arrangement according to an exemplary embodiment of the present invention.
Figure 2:
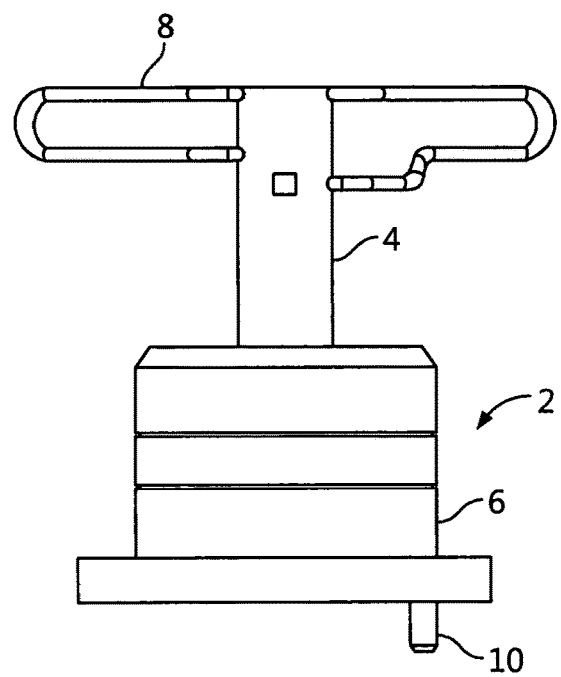

Referring to FIGS. 1 to 3 there is the second fluid switch or what will herein be termed the spindle arrangement 2 for incorporation into a hydraulic switch arrangement for use in a hydraulic circuit. The hydraulic circuit may be used for example in operation of an apparatus such as an excavator arm and/or release of a bucket therefrom, or operation of the arms of a fork lift truck. The operational configuration of the spindle arrangement determines the operational configuration of the apparatus into which it is incorporated dependent on orientation of the spindle arrangement 2, or enables and disables possibility of release of, for example, a bucket from an excavator arm unless a certain orientation is apparent.

The spindle arrangement 2 comprises a rotatable element 4 which is rotatably mounted relative to a housing 6. The rotatable element 4 has a pair of arms 8 extending therefrom which extend away from the axis of the rotatable element 4 and diverge from each other. The arms 8 may be shaped to form a paddle, however, it is beneficial that the paddles are shaped as frames only to allow for hydraulic oil presence in a channel 7 frames allow for ease of hydraulic fluid to pass therethrough with reduced resistance to movement. The arms 8 sit in a channel 7 in the body of a hydraulic switch arrangement (not shown in FIGS. 1 to 3) and are activated by movement of a ball 11 which rolls along the channel 7 under the force of gravity impinging upon an arm 8 causing the rotatable element 4 to rotate about its longitudinal axis. A switching effect is thus achieved. An element 10 is provided which extends from the base of the housing which is configured in order that the element 10 is received by a corresponding opening in the switch in order that the spindle arrangement 2 is secured in the switch.

Figure 3A:
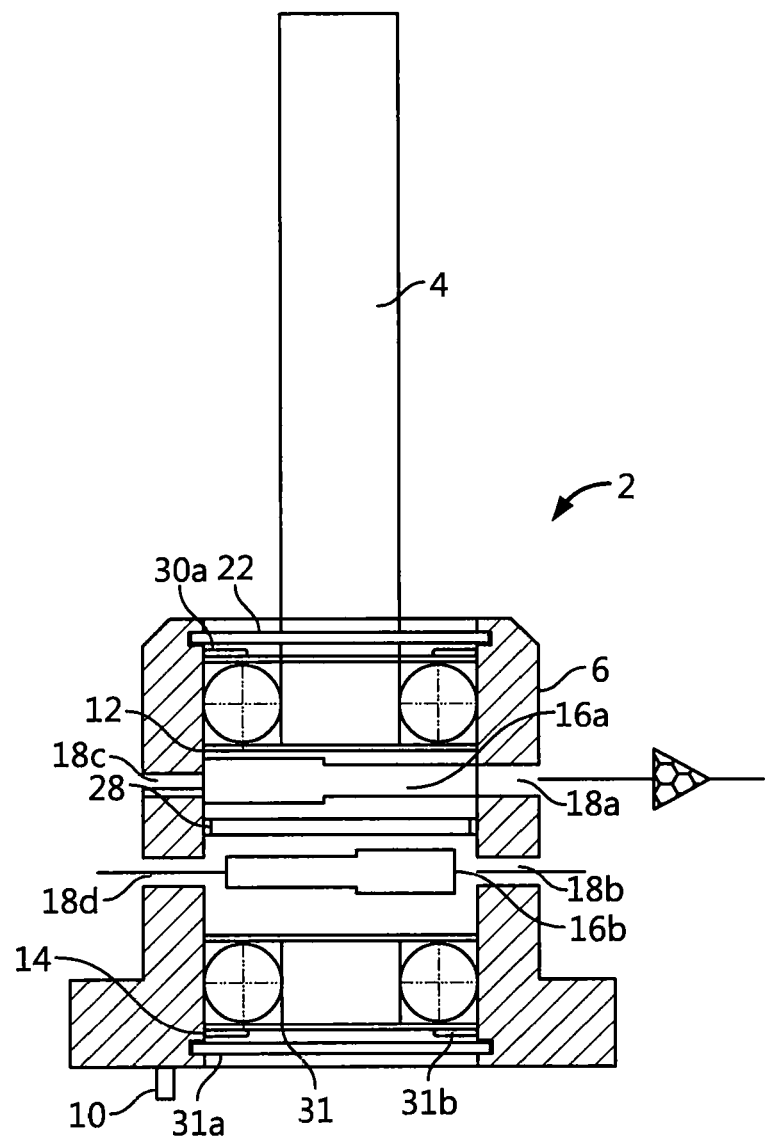
Figure 3B:
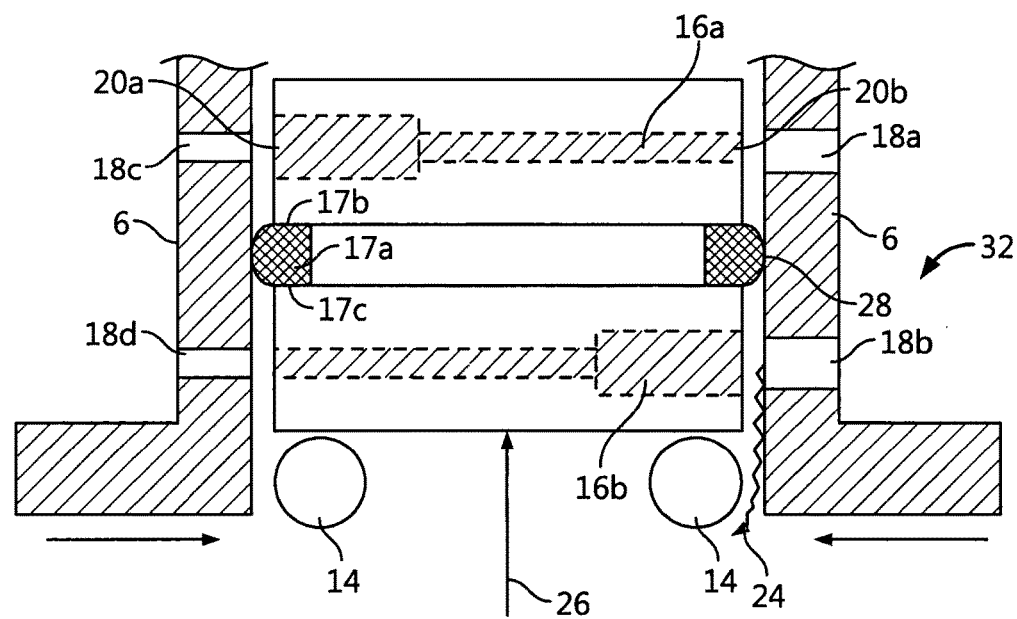

Referring to FIGS. 3a and 3b, a cross section of the spindle arrangement (2) is shown. The rotatable element 4 is rotatably mounted in the housing 6 on an upper and lower bearing set 12, 14. Close machine tolerances are provided between the rotatable element 4 and housing 6 as presented in FIG. 3a, however, FIG. 3b has been presented with enlarged tolerances to improve understanding. Contact between the rotatable element 4 and the housing 6 is not desirable as in order for rotation of the spindle to occur this friction force must be overcome. This would also cause wear and would reduce the accuracy of the switch to small differences in angle of tilt.

Shown in FIG. 3a in cross section, the rotatable element 4 comprises first 16a and second 16b through-passages, longitudinally spaced and capable of being orientated with ducts 18a and 18b respectively in the housing 6. FIGS. 3a and 3b are schematic representations and it will be appreciated that passages 16a and 16b are angularly spaced with respect to each other such that rotation of the rotatable element 4 about its longitudinal axis can selectively align passages 16a and 16b with the ducts 18a and 18b in the housing 6 respectively. As such it is not possible to have through-passages 16a aligned with duct 18a and through-passage 16b and duct 18b aligned at the same time.

Represented in FIG. 3a is the alignment of through-passage 16a with ducts 18a and 18c meaning that hydraulic fluid can pass through the through-passage 16a. In this configuration the through-passage 16b is misaligned with ducts 18b and 18d meaning that hydraulic fluid cannot pass through through-duct 16b. This is termed the non-activated configuration where the hydraulic switch arrangement allows the hydraulic circuit into which it is incorporated to function normally.

A seal is provided located axially with respect to the rotatable element 4 between the duct 16a and 16b. The seal 28 is a fluid seal and can be termed a labyrinth seal and prevents passage of hydraulic oil between the outer perimeter of the rotatable element 4 and the inner surface of the housing 6 in either the generally downward direction relevant for passageway 16a and in the generally upward direction relevant for passageway 16b. The seal 28 is important and it has been found that a fluid seal ensures that migration upwardly of oil from duct 18b in the non-activated configuration as shown in FIG. 3a of the switch is prevented. This is achieved at least in part due to the shape of an annular recess, which is preferably defined by wall 17a substantially parallel to the axis of rotation and transverse substantially parallel walls 17b and 17c. This is best presented in FIG. 3b which presents the spindle arrangement 2 of FIG. 3a, however, the tolerances have been exaggerated to clearly identify the fluid seal. The axial wall 17a, and parallel walls 17b and 17c of the annular recess have been presented as being formed in the rotatable element 4 but it will be appreciated that this annular recess may alternatively be formed in the housing 6. The seal 28 is positioned longitudinally between the upper and the lower bearing set 12, 14.

The spindle arrangement 2 further comprises a thrust collar 22 arranged to be secured to the housing 6 arranged to protect the bearings 12, 14. It will be appreciated that one or both bearings themselves may include a thrust collar. The rotating element 4 and upper and lower bearings 12, 14 are arranged to be supported by at least one resiliently biasing element which allows some longitudinal or axial movement of the rotating element 4 relative to the housing 6. In the exemplary embodiment there is a first and second spring element 30a and 30b which enable this axial movement of the rotating element 4. This is beneficial as this ensures that force upwardly in the direction indicated by arrow 26 is accommodated and does not affect the rotational ability of the rotational element 4. This is important to ensure that sensitivity of the hydraulic switch in operation is maintained irrespective of axial force on the rotating element 4.

Referring in more detail to FIG. 3b, in the non-activated configuration a pilot line from the main hydraulic circuit is directed to duct 18b. This is represented by arrow 32. The hydraulic oil is under high pressure and will sit against the rotating element 4 as the through-passage 16b is misaligned with the duct 18b. When the system first enters use and oil flows through the pilot line then there will be some migration of oil to the fluid seal to provide the hydraulic oil of the fluid seal 28. There is then further migration of hydraulic oil as represented by arrow 24 to the bearing 14 which is then retained through the provision of a cover 31 which in turn is retained by a circlip 31a. This causes an axial force represented by arrow 26 onto the rotating element 4 which is then accommodated by the spring elements 30a and 30b. As such the spring elements 30a and 30b act to resist the thrust force on the rotational element 4. An advantage of this configuration is that the fluid seal 28 ensures migration of hydraulic oil downwardly only to the bearing 14. This means that the bearing 14 is lubricated and heat transfer is managed.

Through-passage 16a is configured to enable release of the hydraulic fluid in the non-activated configuration as represented in FIG. 3a. In this configuration through-passage 16a is aligned with duct 18a and 18c. The diameter of the through-passage 16a changes along the through-passage and comprises a smaller cross sectional area at the outlet 20b compared to the inlet 20a. The cross sectional area of the through-passage 16b is also variable across the length of the through-passage particularly from the inlet thereto as will be described in more detail with respect to FIG. 4.

When the switch is in the non-activated "off" position and as such the apparatus into which the switch and thus the spindle arrangement 2 is mounted is not tilted beyond the set horizontal position, the member comprising a ball 11 impinges on one of the arms 8 causing misalignment of the second through-passage 16b with the duct 18b thus preventing through flow of hydraulic fluid through the through-passage 16b. Hydraulic fluid from the hydraulic system of the apparatus such as the excavator or tele-truck for example may be reduced in pressure by a known pressure reducing means however a pressure will be maintained through the duct 18b and thus be in contact with the spindle body. This force may be of the order of 2.5 kg load in an axial direction onto the rotatable element 4 and this load is permanently applied unless actuation of the switch occurs. As previously described there is a small gap between the outer surface of the rotatable element 4 and the inner surface of the housing 6, and a hydraulic fluid flow path is provided. Such a flow path is configured to enable a small amount of hydraulic fluid to pass between the gap defined by the outer surface of the rotatable element 4 and the inner surface of the housing 6 and flow to the lower bearing 14. This ensures that the bearing 14 is permanently lubricated thereby improving the rotational characteristics of the bearing and reducing the resistance to movement in the bearing. This improves the sensitivity of movement of the rotatable element 4 relative to the housing. Such a configuration is important to the sensitivity of the spindle arrangement as reduction in friction in the upper and lower bearings 12, 14 reduces the force required to move the switch from the "off" to the "on" and "on" to "off" operational configuration. This means that the switch can be mounted in the apparatus such as the excavator or tele-truck and set to activate once the apparatus has tipped or tilted beyond a very specific and selectable angle.

In the "off" state the first through-passage 16a aligns with duct 18c and in this state the duct 18c aligns with the first through-passage 16a enabling any hydraulic fluid in the system to be transferred through the first through-passage 16a and out through duct 18a which then dumps to the chamber in which the ball rotates as will be described later in the specification.

Figure 4:
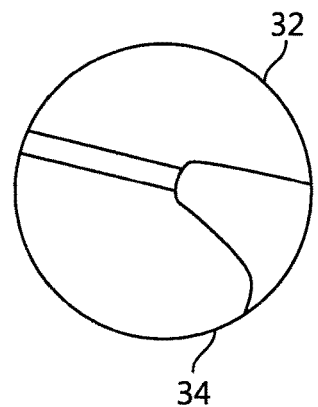
FIG. 4 is a schematic cross sectional view of the channel through the spindle arrangement and through which oil passes when the switch changes to the operational configuration.

Referring to FIG. 5 in combination with FIG. 4, as the ball 11 moves through the chamber 7 due to tilting of the hydraulic switch arrangement occurring and under the force of gravity, the ball impinges on the arm 8 thus causing rotation of the rotatable element 4. Referring to FIG. 5, the spindle is caused to rotate in this example in the anticlockwise direction until the hydraulic fluid sitting at duct 18b providing a load onto the rotatable element 4 comes into alignment with the second through-passage 16b. Arrow 32 indicates the action of the hydraulic fluid sitting at duct 18b. As the rotatable element 4 rotates further, the duct 18b and second through-passage 16b come into alignment. At the point at which hydraulic fluid begins to pass into the second through-passage 16b, the direction of movement of the hydraulic fluid will be across the first through-passage 16a and initially impinge on an opposing convex surface 34 defining one side of the through-passage as represented in FIG. 4. Such a convex surface 34 is beneficial as the hydraulic fluid hits the surface and begins to pass through the second through-passage 16b. Due to the curvature and preferably convex contact face at the point at which the hydraulic fluid hits, a force is applied to the rotatable element 4 forcing the rotatable element 4 through its final rotation to the point that alignment between the second through-passage 16b and duct 18b is achieved. The provision of a convex surface 34, contrary to better expected performance of a concave surface, causes rotation from the 'off' state to the 'on' state to be quick thus ensuring that the switch is activated as quickly as possible. Furthermore, the increased cross sectional area at the opening of the second through-passageway 16b increases the pressure into the second through-passage 16b further increasing speed of actuation of the switch. In use this is important as it is clearly beneficial to reduce the timeframe between tilted of the switch and thus movement of the ball and actuation of the switch.

Referring to FIG. 4, there is a schematic representation of a hydraulic switch in which the spindle arrangement 2 may be incorporated. It will be appreciated that the switch as a whole may be provided in a housing or body which incorporates the chamber along which the ball can roll and the spindle arrangement and is configured to be secured for example to the body of a tele-truck or the boom of an excavator in-line with the hydraulic circuit that operates the apparatus. With reference to a tele-truck, in which prongs extend from the front of the tele-truck, the significant danger of tipping over is in the longitudinal axis of the prongs. Accordingly, the hydraulic switch arrangement is located such that the switch arrangement is tilted in an upward direction towards the direction in which the prongs extend. The tilting angle of the switch is set dependant on the specific requirements of that tele-truck or enforced legislation. For example, if the safe angle of operation of the tele-truck is less than 5°, then the switch may be set at an angle upwardly to the horizontal of 5°. If the tele-truck then tilts forward by 5° or greater, the switch will also tilt 5° or greater thereby moving to the horizontal and then subsequently downward direction meaning that the switch is activated. Accordingly, when the switch is activated, hydraulic fluid to enable activation of the prongs of tele-truck will be prevented as described below. Therefore, in use, once the tele-truck tilts beyond the preset angle, the ball (not shown) travels through the chamber, wherein the chamber is mounted parallel to the axis in which the tele-truck will tilt leading to potential danger, and the ball impinges on the arms 8 of the spindle arrangement 4 thus causing rotation thereof.

Reference is now made to FIGS. 5a and 5b which show a spindle arrangement 2 in operation accordingly to an exemplary embodiment of the present invention and also a hydraulic switch arrangement according to an exemplary embodiment of the present invention. FIG. 5a represents the hydraulic switch arrangement in the non-activated configuration whereby for example the tele-truck may be operating in a normal configuration whereby hydraulic fluid is passing around the hydraulic circuit of the system. FIG. 5b is then representative of the hydraulic switch arrangement in the activated configuration whereby hydraulic fluid is prevented from passing around the main hydraulic circuit. Activation is caused through the tilting of the hydraulic switch arrangement which in turn causes rotation of the rotating element of the spindle arrangement.

The hydraulic switch arrangement comprises a body 70 and includes therein the spindle arrangement 2 forming the second fluid switch. The arms 8 of the spindle arrangement 2 communicate with a ball 11 which is received in a chamber 7 defined in the body 70. The ball 11 is capable of movement through the channel 7 thus impinging on the arms 8 causing rotation of the rotating element 4 and thus changing the operational configuration of the second fluid switch. The first fluid switch 72 in one embodiment comprises a valve beneficially comprising a spool valve which in the configuration as identified in FIG. 5a, wherein the switch is non-activated, a channel 76 is aligned with the main hydraulic oil circuit of the apparatus into which the switch is incorporated which enables transfer of the hydraulic fluid straight out of the body 70 through outlet 76 thereby having no effect on the operation of the apparatus. The spool valve 72 is known in the art and comprises a body 78 moveable in a housing 80 wherein the passage of hydraulic fluid therethrough is enabled when the channels 74 align with the main line inlet 82. The body 78 is moveable within the housing 80 against a spring 84 which spring 84 biases the body 78 to align the channel 74 with the inlet 82.

The switch further comprises a channel 86 arranged to divert a pilot line of main line oil from the hydraulic circuit to the spindle arrangement 2. In the normal operable configuration pilot oil is transferred through this channel and sits at duct 18b of the spindle arrangement 2 against the rotating element 4. In the non-activated configuration as represented in FIG. 5a there is no alignment of the through-channel 16b with the duct 18b meaning that there is no activation of the switch.

In the configuration of FIG. 5a and also as represented in FIG. 3a, the through-passage 16a is aligned with ducts 18a and 18c. A channel 88 aligns with the duct 18a in order to release any residual hydraulic oil in the switch into the chamber 7. In this configuration the duct 18c is aligned with channel 90 which splits into first and second channels 90a and 90b. Channel 90b aligns with the chamber 81 which is defined by the housing 80 and in the non-activated configuration defines a fluid flow path to enable release of any hydraulic oil defined between the body 78 and the housing 80 at the rearward portion of the spool valve 72 to be released back through the through-channel 16a into the chamber 7. The first channel 98 is in fluid communication with a check-valve 92. The check-valve 92 includes a signal port 94, a dump port 96 and communication channel 97 which extends from the dump port 96 to the chamber 7 and a release port 98 arranged to be in fluid communication with the chamber 81 at the forward end of the body 78 in the chamber 81 which includes the spring 84. In operation the spindle arrangement causes movement of the body 78 against the spring 84 to cause misalignment of the channel 74 with the inlet 82.

It will be appreciated that a significant advantage of the present invention is that the chamber 7 is not subjected to main line hydraulic fluid pressure thereby ensuring sensitivity to rotation of the rotating element 4.

Not shown in FIG. 5a is a channel extended to link the channel 90 to both the through-channels 16a and 16b. This may occur at hub 100. This is to ensure that in the activated configuration as represented in FIG. 5a on transfer from the activated back to the non-activated configuration there is minimal impediment to rotation of the rotating element 4.

The hydraulic fluid which may be termed in an exemplary embodiment the signal oil is at a pressure in the hydraulic system of the tele-truck of approximately 100 bar, and an arrangement may be provided to reduce this pressure significantly prior to sitting in the duct 18b waiting for actuation of the spindle arrangement. In this "off" state, the spindle is non-activated and any oil in the system passes back to the chamber 7. Excess oil overflows from the chamber 7 to the main hydraulic circuit to avoid overfilling and impedance of rotation of the rotational element 4.

As described, FIG. 5a shows the switch in the normal or non-activated configuration. The main line supply of the hydraulic oil passes straight through the channel spool valve which has a larger bore and passes through at high pressure. At this time there is nothing going on in the hydraulic switch. A pilot supply from the main hydraulic circuit of smaller diameter than the main supply passes to the spindle arrangement 2. In this configuration the through-passage is misaligned meaning that there is oil pressure against the rotating element 4 and there is some migration of hydraulic fluid to the lower bearing 14. This system functions in this configuration as the hydraulic switch arrangement tilts, or the ball 11 is caused to move, the ball 11 then bears against the arms or paddle 8 for starting rotation anticlockwise of the rotating element 4. The through-passage 16b of the rotating element 4 then starts to align with the pressurised pilot oil channel 86 and duct 18b. As soon as oil starts passing into the through-passage 16b it hits the curved, convex surface 34, it causes the rotating element 4 to flick around aligning the through-passage 16b with duct 18d which transfers pilot oil through channel 90a to signal port 94. Communication of oil with signal port 94 has the effect of opening the release port 98. Simultaneously, pilot oil transfers through channel 90b to force oil into the rearward end of chamber 81 comprising a first chamber position defined between the rearward face of the body 78 and the internal surface of the housing 80. This has the effect of pushing the spool valve body 78 across, i.e., to the right in FIG. 5a against the spring 84. In normal circumstances, this pilot oil would also be pushing against the oil that is contained in the spool valve that surrounds the spring 84. However, the oil in the spool valve in this second chamber portion, present as a result of migration thereto between body 78 and housing 80, has released due to the opening of the release port 98 meaning that the spool valve channel 74 is out of alignment with the main line supply and the main line supply is effectively switched off. The spring is then compressed in this configuration as shown in FIG. 5b. The small shot of oil from the second chamber portion housing the spring is transferred via the dump port 96 and dumped into the ball chamber 7. This is therefore shown in the activated configuration in FIG. 5b.

The main line supply oil is now prevented from flowing leading to prevention of operation of the hydraulic circuit of the apparatus. In such a configuration, it is therefore impossible, for example, for a tele-truck to lift any load any further, and it is only possible for the tele-truck to lower the load that it is carrying. Accordingly, the operator immediately knows that there is a danger with the incline of the tele-truck whether through the excess weight of the load or the incline on which the tele-truck is on and accordingly makes adjustments either through reducing the load or lifting the load from a different position.

It will be appreciated that as soon as the tele-truck returns back to a tilt angle in which is deemed safe by the switch, the rotating element 4 rotates as a result of impingement of the ball on the opposing arm. The ball 11 then travels back along the ball chamber 7 once the rotation of a rotating element 4 has completed. This initial movement is assisted by a fluid path of oil from the pilot channel 86 in the activated configuration of the switch bearing against the rotation element 4 due to misalignment of through-channel 16a with duct 18c in the spindle arrangement housing 6, in exactly the same way that the switch was charged from the non-activated to activated configuration. At this time the second through-passage 16c aligns with ducts 18c and 18a. Residual oil in the system particularly within the spool valve is then released and again is dumped into the ball chamber 7. The switch has therefore transferred back to the at rest configuration. As the oil is released from the rearward side of the spool valve, the spring 84 pushes the spool valve body 78 back thereby aligning the main line supply with the channel 74 such that the main line supply restores use of the hydraulic system.

Figure 6:
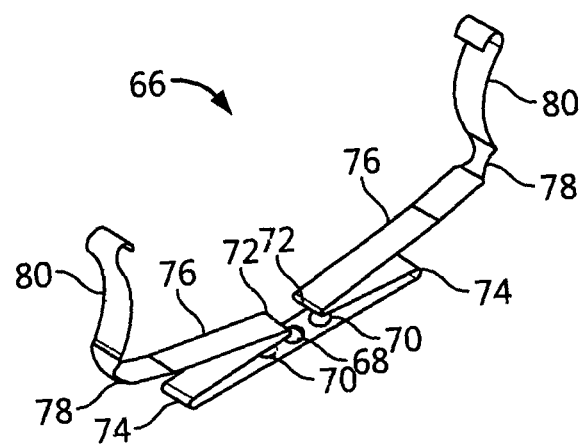
FIG. 6 is a schematic representative of a spring element that can be provided to assist movement of a member through the chamber in a hydraulic switch according to an exemplary embodiment of the present invention.

Referring to FIG. 6, in the chamber 7 in which the ball can roll, there may be provided a spring element 66 which may be secured to the chamber via a threaded screw which passes through aperture 68 and further locates with respect to dowels which pass through apertures 70. The spring element 66 is provided as a biasing element and is substantially U-shaped. Each side of the spring comprises a knee portion 72 and each side of the spring is configured to flex at the knee portion 72 and at second knee portion 74. Each side of the spring then comprises an elongate portion 76 at the end of which is provided a hip 78 to which is connected an end retaining element 80. The hip connects the elongate portion 76 to the retaining element 80 and is a reduced thickness and thus strength relative to the elongate portion 76 and the retaining element 80. The retaining element 80 is convex and is configured such that in the "off" state of the switch one of the retaining elements 80 will contact the ball. The hip 78 is provided in order that significant flexibility of the retaining element is achieved. The provision of such a spring, which may be termed a leaf spring, is provided such that in the "off" state one side of the leaf spring retains the ball and is therefore deformed by the weight of the ball. As the switch begins to tilt so as to represent a declination to the ball, the ball will begin to roll along the channel and thus along the leaf spring. The deformation of the side of the leaf spring in which the ball is located in the "off" state means that on activation of the switch, the spring assists the passage of the ball along the channel. The opposing side of the leaf springs acts to "catch the ball" however due to the ball's momentum the leaf spring will still deform. When the switch is then titled from the "on" state to the "off" state, this side of the leaf spring acts to assist the passage of the ball along the channels. Accordingly, as the ball in the chamber in which oil is located clearly creates some friction, the spring reduces this problem in order that the switch will activate at the required angle, rather than only activate once an angle significantly greater than set value is achieved.

It will be appreciated that the present switch may be used for both dual acting systems, for example an excavator or tele-truck, and single acting systems for example a fork lift truck. It will be appreciated that a skilled person that a dual acting system has two pumps and therefore the need for a pressure reducing system.

One of the significant advantages of the present invention is the sensitivity of the switch to tilting. Accordingly, the switch can be set to activate at a predetermined angle and the switch according to the present invention will activate at this angle rather than requiring the angle to be exceeded significantly before activation actually occurs. For this reason, sensitivity is significantly improved.

Aspects of the present invention have been described by way of example only and it will be appreciated by a skilled addressee that modification and variation may be made without departing from the scope of protection afforded by the appended claims.

For example, the chamber in which the member is disposed for movement along the predetermined path may be non-linear. In one embodiment there may be a step or shoulder past which the member must transfer in order to cause the spindle arrangement to move a first operational configuration to a second operational configuration. This is beneficially in certain applications for example in situations to control release of a bucket from an excavator. This will ensure that beyond vertical orientation of the boom is achieved before release of the bucket is enabled.

It will be further appreciated that the present invention may be an inertia switch, and may include a spindle arrangement as hereinbefore described.

The invention claimed is:

1. A hydraulic switch arrangement for incorporating into a hydraulic circuit comprising:
 a first fluid switch operational in an open and closed configuration for enabling and disabling flow of hydraulic fluid through a hydraulic circuit;
 a second fluid switch having at least one through-passage configured to receive hydraulic fluid from the hydraulic circuit, the second fluid switch operational in a first operational configuration arranged to inhibit passage of hydraulic fluid through the through-passage, and a second operational configuration configured to permit passage of hydraulic fluid through the through-passage; the second fluid switch comprising a rotatable element rotatably mounted to a housing, at least one bearing arranged to enable relative rotation between the rotatable element and the housing, the rotatable element defining the through-passage arranged to align with a duct in the housing in the second operational configuration, wherein a hydraulic fluid flow path is defined between the duct and the at least one bearing in the first operational configuration;
 wherein the arrangement is configured such that change between the first and second operational configuration of the second fluid switch causes change in the operational state of the first fluid switch between the open and closed configuration.

2. A hydraulic switch arrangement according to claim 1, wherein the first fluid switch is arranged to be positioned into the primary fluid flow path in a hydraulic circuit.

3. A hydraulic switch arrangement according to claim 1, wherein the first fluid switch and second fluid switch are arranged to be positioned in parallel in the fluid flow path in a hydraulic circuit.

4. A hydraulic switch arrangement according to claim 1, wherein the second fluid switch is in fluid communication with a pilot hydraulic fluid line arranged to be in fluid communication with the hydraulic circuit.

5. A hydraulic switch arrangement claim 1, wherein a bore defining a hydraulic fluid flow path through the first fluid switch is greater than a bore of the through-passage.

6. A hydraulic switch arrangement according to claim 1 further comprising a body formed with a chamber and a member disposed in the chamber for movement along a pre-determined path, the second fluid switch comprising the rotatable element having a pair of arms disposed on either side of the member such that the member impinges on one arm or the other in the event of movement in one direction or the other along the pre-determined path to correspondingly turn the rotatable element and change the operational configuration of the second fluid switch.

7. A hydraulic switch arrangement according to claim 6, wherein there is a fluid flow path defined between the first fluid switch and the chamber.

8. A hydraulic switch arrangement according to claim 1, wherein the first fluid switch is in fluid communication with the through-passage, and the first fluid switch is arranged to switch between the open and closed configuration by fluid flow from the through-passage.

9. A hydraulic switch arrangement according to claim 1, the second fluid switch comprising a second through passage, where in the first operational configuration the second fluid switch is arranged to permit passage of hydraulic fluid through the second through-passage and in the second operational configuration the second fluid switch is configured to inhibit passage of hydraulic fluid through the second through-passage.

10. A hydraulic switch arrangement claim 1, comprising a housing for accommodating the first and second fluid switches, the housing comprising a first inlet for fluid communication with the first fluid switch, and a second inlet arranged to communicate with the second fluid switch.

11. A hydraulic switch arrangement according to claim 10, wherein the through- passage has a mouth, and wherein the through-passage tapers inwardly from the mouth.

12. A hydraulic switch arrangement claim 1, comprising a tilt switch and/or an inertia switch.

13. A hydraulic switch arrangement for incorporating into a hydraulic circuit comprising:
 a first fluid switch operational in an open and closed configuration for enabling and disabling flow of hydraulic fluid through a hydraulic circuit;

a second fluid switch having at least one through-passage configured to receive hydraulic fluid from the hydraulic circuit, the second fluid switch operational in a first operational configuration arranged to inhibit passage of hydraulic fluid through the through-passage, and a second operational configuration configured to permit passage of hydraulic fluid through the through-passage;

a body formed with a chamber and a member disposed in the chamber for movement along a pre-determined path, the second fluid switch comprising the rotatable element having a pair of arms disposed on either side of the member such that the member impinges on one arm or the other in the event of movement in one direction or the other along the pre-determined path to correspondingly turn the rotatable element and change the operational configuration of the second fluid switch, a fluid flow path being defined between the first fluid switch and the chamber;

wherein the arrangement is configured such that change between the first and second operational configuration of the second fluid switch causes change in the operational state of the first fluid switch between the open and closed configuration.

* * * * *